US010913065B2

(12) United States Patent
Domingue et al.

(10) Patent No.: US 10,913,065 B2
(45) Date of Patent: Feb. 9, 2021

(54) FLUID SENSING WITH CONTROL OF PARTICLE AGGREGATION IN SENSING ZONE

(71) Applicant: HEWLETT-PACKARD DEVELOPMENT COMPANY, L.P., Houston, TX (US)

(72) Inventors: Chantelle E. Domingue, Corvallis, OR (US); Manish Giri, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 335 days.

(21) Appl. No.: 15/764,975

(22) PCT Filed: Jan. 22, 2016

(86) PCT No.: PCT/US2016/014629
§ 371 (c)(1),
(2) Date: Mar. 30, 2018

(87) PCT Pub. No.: WO2017/127120
PCT Pub. Date: Jul. 27, 2017

(65) Prior Publication Data
US 2019/0039063 A1 Feb. 7, 2019

(51) Int. Cl.
*B01L 3/00* (2006.01)
*G01F 1/704* (2006.01)
(52) U.S. Cl.
CPC ..... *B01L 3/50273* (2013.01); *B01L 3/502715* (2013.01); *B01L 3/502738* (2013.01);
(Continued)

(58) Field of Classification Search
CPC ........... B01L 3/50273; B01L 3/502715; B01L 3/502738; B01L 3/502746;
(Continued)

(56) References Cited

U.S. PATENT DOCUMENTS 6,200,532 B1   3/2001   Wu et al.
6,398,329 B1   6/2002   Boyd
(Continued)

FOREIGN PATENT DOCUMENTS

CN   101715483   5/2010
CN   102257378   11/2011
(Continued)

OTHER PUBLICATIONS

Erik D. Torniainen et al: "Bubble-driven inertial micropump", Physics of Fluids, vol. 24, No. 12, Dec. 11, 2012 (Dec. 11, 2012), U.S.
(Continued)

*Primary Examiner* — Lore R Jarrett
(74) *Attorney, Agent, or Firm* — Perry + Currier Inc

(57) ABSTRACT

An apparatus includes a chamber, a nozzle connected to the chamber, a fluid driver proximate the driver to expel fluid from the chamber through the nozzle, a microfluidic passage, an inlet connecting the microfluidic passage and the chamber, a sensor proximate the inlet to sense fluid within a fluid sensing zone within the inlet, and a particle aggregation limiter to control aggregation of particles within the sensing zone.

10 Claims, 7 Drawing Sheets

(52) U.S. Cl.
CPC ... *B01L 3/502746* (2013.01); *B01L 3/502753* (2013.01); *G01F 1/704* (2013.01); *B01L 2200/0652* (2013.01); *B01L 2300/0645* (2013.01); *B01L 2300/0877* (2013.01)

(58) Field of Classification Search
CPC ....... B01L 3/502753; B01L 2200/0652; B01L 2300/0645; B01L 2300/0877; G01F 1/704
See application file for complete search history.

(56) References Cited

U.S. PATENT DOCUMENTS

| | | |
|---|---|---|
| 8,257,666 B2 | 9/2012 | Quake et al. |
| 8,329,437 B1 | 12/2012 | Ayliffe |
| 9,068,181 B2 | 6/2015 | Edd et al. |
| 9,213,024 B2 | 12/2015 | Sniadecki et al. |
| 2002/0108889 A1 | 8/2002 | Fujii et al. |
| 2003/0235926 A1 | 12/2003 | Knollenberg |
| 2006/0194307 A1 | 8/2006 | Yasuda et al. |
| 2007/0081045 A1 | 4/2007 | Silverbrook |
| 2009/0278880 A1 | 11/2009 | Dijksman et al. |
| 2010/0163412 A1 | 7/2010 | Attinger et al. |
| 2010/0267066 A1 | 10/2010 | Hosokawa et al. |
| 2011/0286493 A1 | 11/2011 | Torniainen et al. |
| 2012/0276641 A1 | 11/2012 | Dimov |
| 2013/0061962 A1 | 3/2013 | Kornilovich et al. |
| 2013/0063528 A1* | 3/2013 | Govyadinov ........ B41J 2/14233 347/68 |
| 2013/0260447 A1 | 10/2013 | Link |
| 2013/0295588 A1 | 11/2013 | Watkins et al. |
| 2014/0057289 A1 | 2/2014 | Savran et al. |
| 2014/0170679 A1 | 6/2014 | Aitchison et al. |
| 2014/0326339 A1 | 11/2014 | Toner et al. |
| 2014/0378341 A1 | 12/2014 | Glezer |
| 2015/0044696 A1 | 2/2015 | Dothie et al. |
| 2015/0108010 A1 | 4/2015 | Ross et al. |
| 2015/0114093 A1 | 4/2015 | Appleyard |
| 2015/0119795 A1 | 4/2015 | Germain |
| 2015/0190767 A1 | 7/2015 | Govyadinov et al. |
| 2015/0328637 A1 | 11/2015 | Perrault, Jr. |
| 2015/0346201 A1 | 12/2015 | Korny et al. |
| 2016/0018360 A1 | 1/2016 | Yang |
| 2016/0114319 A1 | 4/2016 | McGuinness |

FOREIGN PATENT DOCUMENTS

| | | |
|---|---|---|
| CN | 103611584 | 3/2014 |
| CN | 101678356 A | 4/2014 |
| TW | 1404929 | 8/2013 |
| TW | 201531700 A | 8/2015 |
| WO | WO-2006115663 A2 | 11/2006 |
| WO | WO-2007076549 | 7/2007 |
| WO | WO-2012054104 A1 | 4/2012 |
| WO | WO-2012064878 A2 | 5/2012 |
| WO | WO-2014178827 A1 | 11/2014 |
| WO | WO-2015116975 A1 | 8/2015 |

OTHER PUBLICATIONS

Davies, M. J. et al., "Whole Blood Pumping with a Microthrottle Pump", Biomicrofluidics 4.4 (Dec. 23, 2010), 044112.

Haeberle, S., et al., "Microfluidic platforms for lab-on-a-chip applications", Lab on a Chip, 7(9), (Jul. 27, 2007), pp. 1094-1110.

* cited by examiner

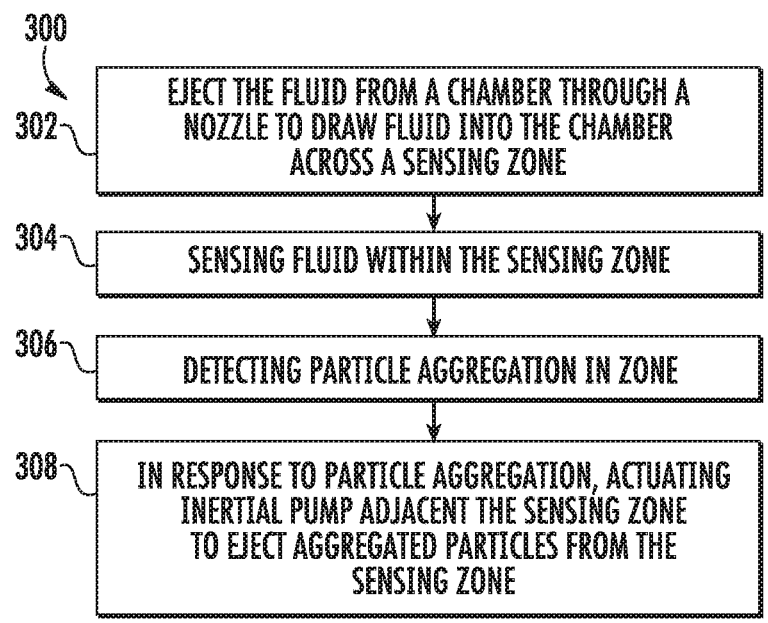
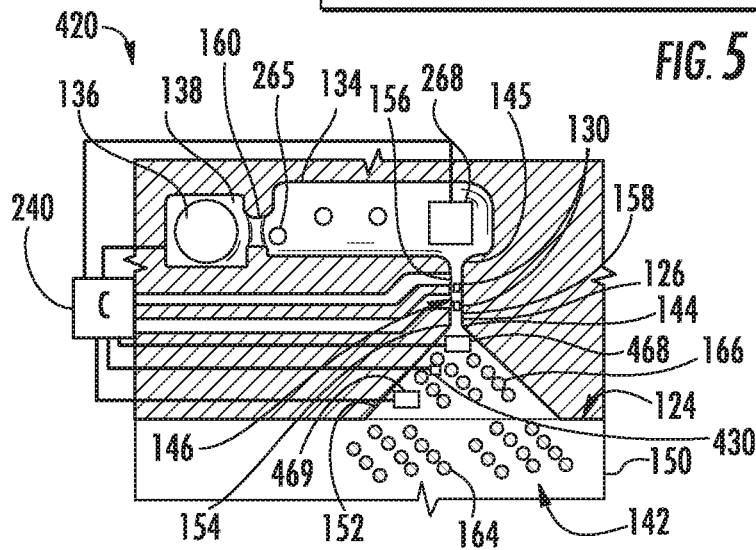
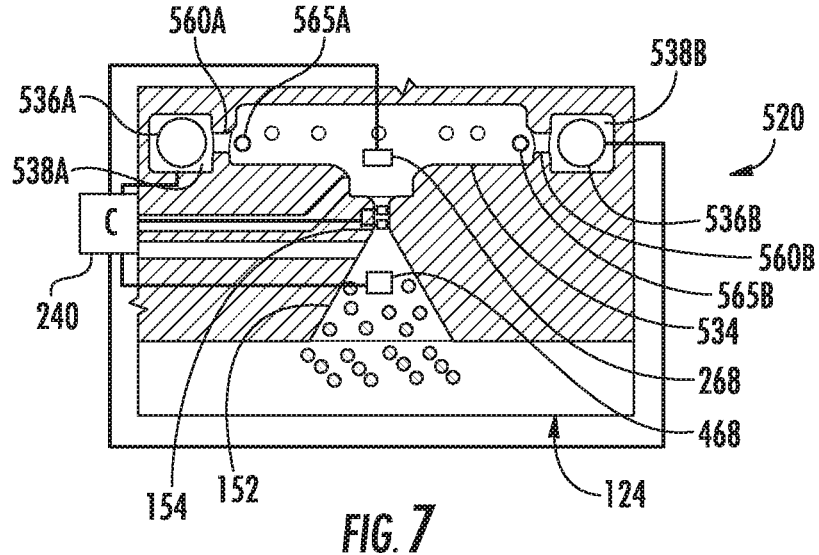

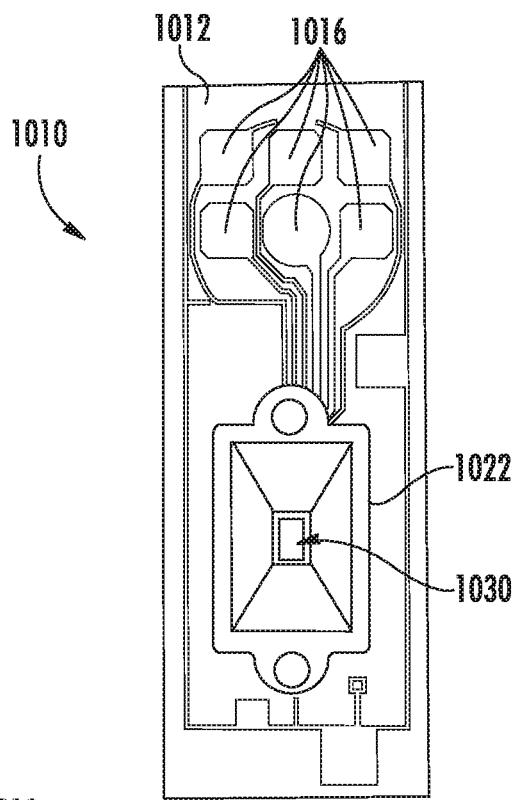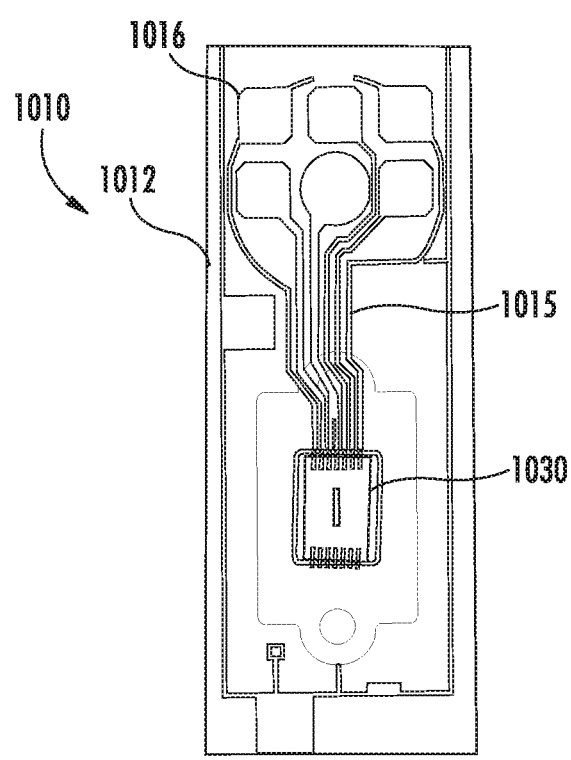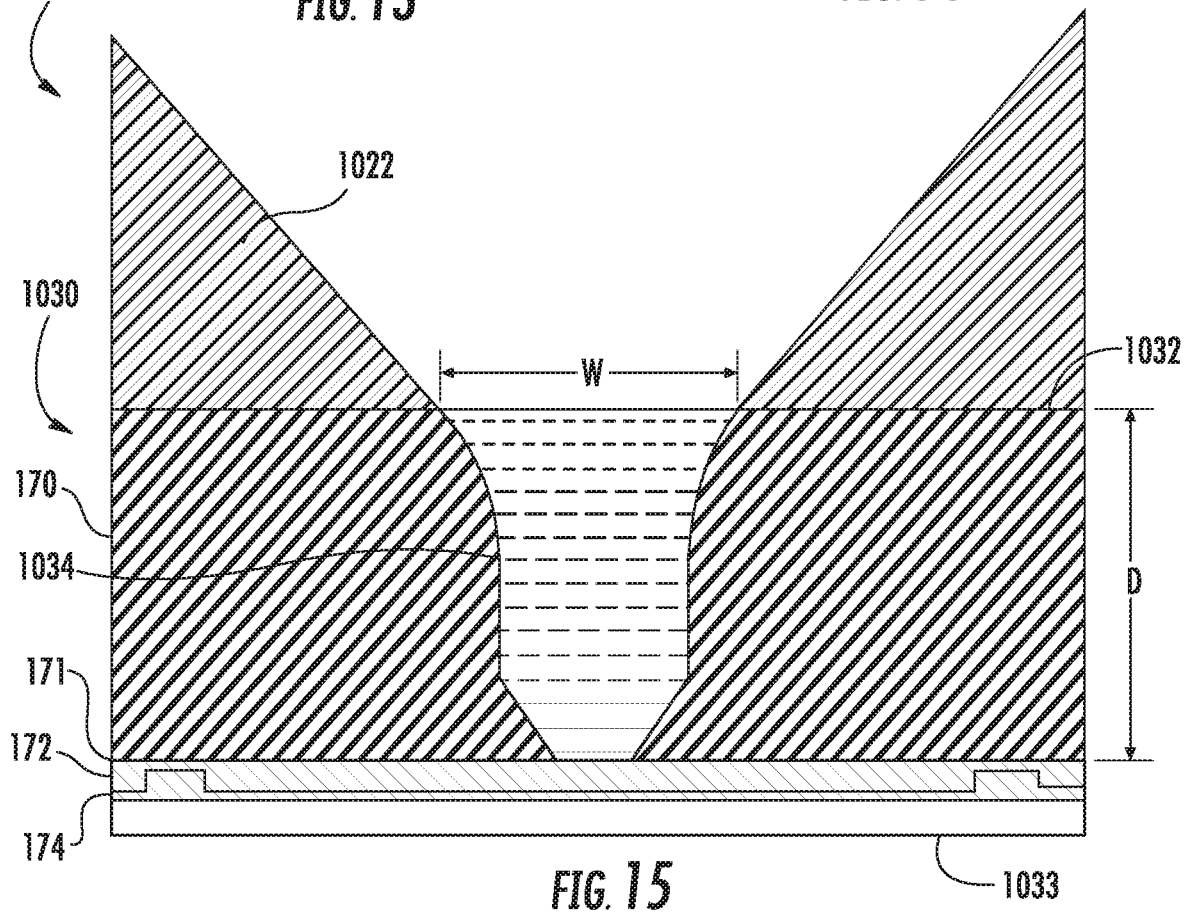

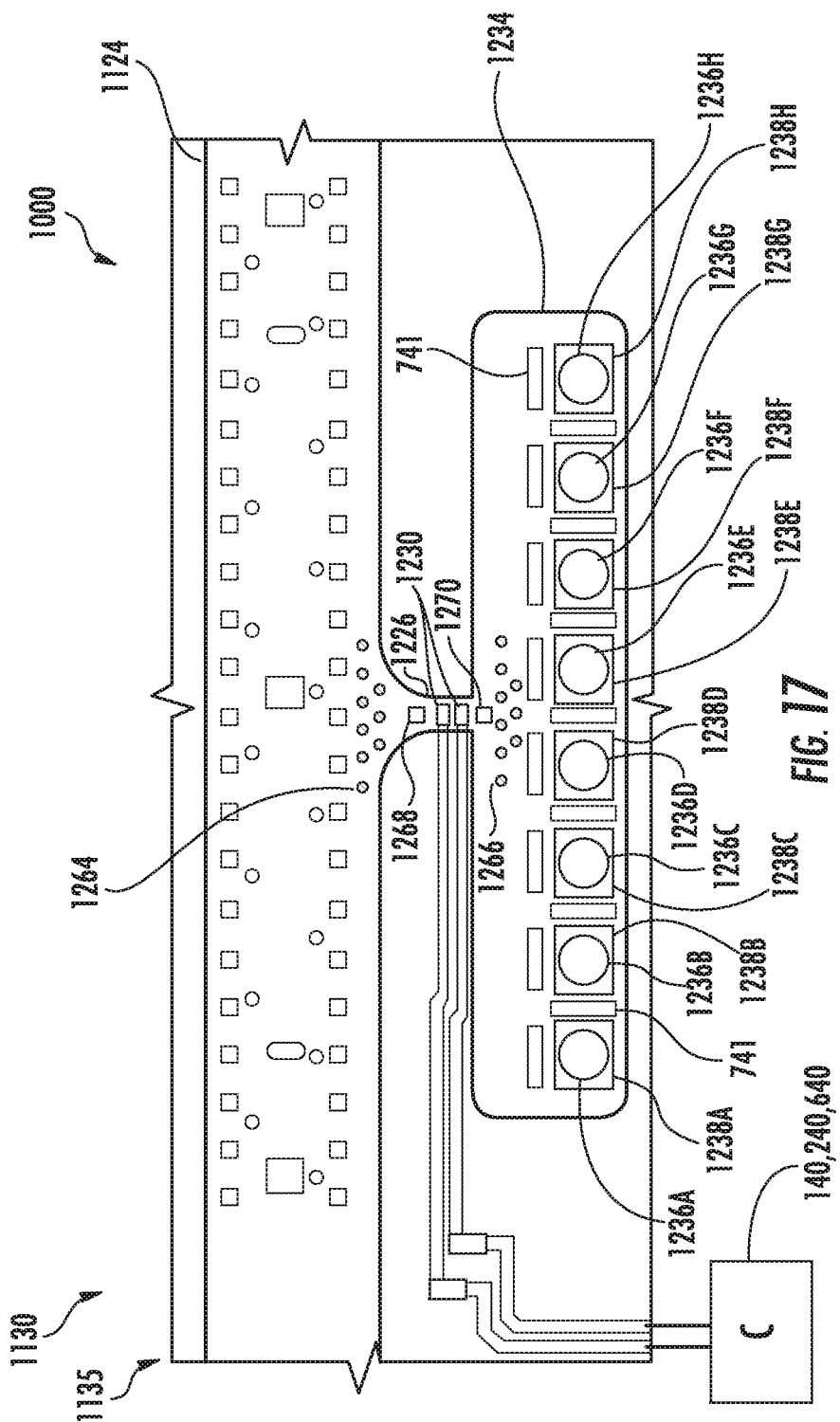

FLUID SENSING WITH CONTROL OF PARTICLE AGGREGATION IN SENSING ZONE

BACKGROUND

Various sensing devices are currently available for sensing different attributes of fluid, such as blood as an example. In some instances, such sensing devices are often large, complex and expensive. Many of such sensing devices involve large samples and/or highly diluted samples.

BRIEF DESCRIPTION OF THE DRAWINGS

FIG. 5 is a flow diagram of an example method for sensing fluid.

FIG. 6 is a schematic diagram of another example fluid sensing system.

FIG. 7 is a schematic diagram of another example fluid sensing system.

FIG. 13 is a top view of an example microfluidic cassette of the testing system of FIG. 12.

FIG. 14 is a bottom view of the example microfluidic cassette of FIG. 13.

FIG. 15 is a sectional view of the example microfluidic chip of FIG. 13.

FIG. 17 is an enlarged view of a portion of the microfluidic chip of FIG. 16.

DETAILED DESCRIPTION OF EXAMPLES

Figure 1:
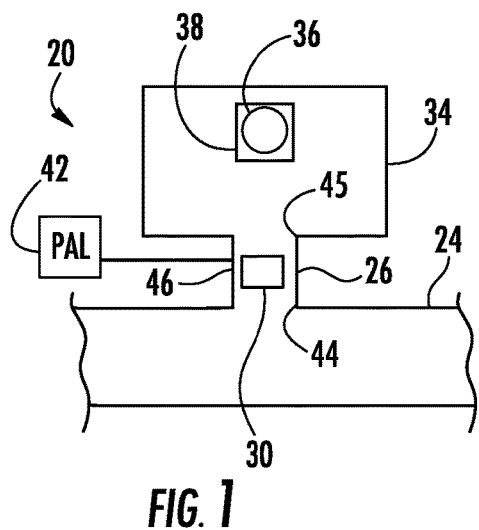
FIG. 1 is a schematic diagram of an example fluid sensing system.

FIG. 1 schematically illustrates an example microfluidic sensing system 20. Microfluidic sensing system 20 comprises a microfluidic channel that directs fluid being tested or diagnosed across a sensing zone. For purposes of this disclosure, the term "microfluidic" as in "microfluidic component" refers to the size or scaling of the component. A microfluidic component comprises a structure or hardware that deals with volumes of fluid on the order of a microliter or less, including nanoliters or picoliters. In some implementations, the structure or hardware that deals with the volumes of fluid has maximum dimensions on the order of millimeters or submillimeters. For example, in one implementation, system 20 utilizes a chip that is 2 mm by 1 mm, wherein the chip underlies a reservoir that holds microliter volumes and wherein the chip itself channels and interacts with submicroliter volumes of fluid.

The microfluidic channel of system 20 may facilitate fluid testing with relatively small amounts of fluid and small amounts of reagent, saving cost while producing less waste and potentially less biohazardous material than existing benchtop methods for fluid testing. System 20 addresses undesirable blockages in its small scaled sensing zone using a particle aggregation limiting architecture, referred to as a particle aggregation limiter, that controls the aggregation of particles within the sensing zone.

As shown by FIG. 1, system 20 comprises microfluidic passage 24, inlet 26, sensor 30, chamber 34, nozzle 36, fluid driver 38 and particle aggregation limiter 42. Microfluidic passage 24 comprises a path along which fluid is supplied to a mouth 44 of inlet 26. In one implementation, microfluidic passage 24 is connected to a sample deposit or fill passage through which a fluid sample to be tested is supplied. In one implementation, microfluidic passage 24 supplies fluid for testing to multiple inlets 26, each inlet containing a sensor 30.

Inlet 26 comprises a microfluidic passage extending off of microfluidic passage 24, from mouth 44, and connected to chamber 34 at outlet 45. Inlet 26 extends adjacent to or contains sensor 30 while defining a sensing zone 46, the zone in which the fluid is sensed by sensor 30. Inlet 26 is sized so as to have a smaller cross-sectional area than that a microfluidic passage 24 and that of chamber 34. Inlet 26 serves as a constriction through which fluid flows. In one implementation, microfluidic passage 26 has a cross-sectional area size according to the expected dimensions of individual biological cells contained in the fluid being tested. For example, in one implementation, inlet 26 is dimensioned such that cells pass through inlet 26 to chamber 34 in a serial fashion, facilitating accurate sensing of the characteristics of the cells of the fluid.

In one implementation, inlet 26 comprises a channel constriction that has a smaller cross-sectional area than both adjacent regions of inlet 26, upstream and downstream of inlet 26. Inlet 26 has a cross-sectional area similar to that of the individual particles or cells that pass through inlet 26 and which are being tested. In one implementation in which the cells being tested have a general or average maximum data mention of 6 μm, inlet 26 has a cross-sectional area of 100 μm$^2$. In one implementation, inlet 26 has a sensing volume of 1000 μm$^3$. For example, in one implementation, sensing zone 46 of inlet 26 has a sense volume having a length of 10 μm, a width of μm and a height of 10 μm. In one implementation, inlet 26 has a width of no greater than 30 μm. The sizing or dimensioning of inlet 26 restricts the number of particles or individual cells that may pass through inlet 26 at any one moment, facilitating testing of individual cells or particles passing through inlet 26.

Sensor 30 comprises a micro-fabricated device formed upon a substrate within the constriction of inlet 26 that senses characteristics of the fluid being tested. In one implementation, sensor 30 comprises a micro-device that is designed to output electrical signals or cause changes in electrical signals that indicate properties, parameters or characteristics of the fluid and/or cells/particles of the fluid passing through inlet 26. In one implementation, fluid driver 38 is fired to draw a fluid sample across inlet 26, wherein electrical signals from sensor 30, after such a firing, shed light on the rate of flow and the composition of the fluid. In one implementation, sensor 30 comprises an impedance sensor which outputs signals based upon changes in electrical impedance brought about by differently sized particles or cells flowing through inlet 26 and impacting impedance of the electrical field across or within inlet 26. In one implementation, sensor 30 comprises an electrically charged high side electrode and a low side electrode formed within or integrated within a surface of inlet 26 within inlet 26. In one implementation, the low side electrode is electrically grounded. In another implementation, the low side electrode is a floating low side electrode.

Chamber 34 comprises a volume into which fluid flows after having been sensed or detected by sensor 30 within sensing zone 46. Chamber 34 contains or surrounds nozzle 36 and fluid driver 38. Nozzle 36 is connected to chamber 34 and comprise an opening through which fluid within chamber 34 is ejected. In one implementation, nozzle 36 opens into or directs ejected fluid into a waste reservoir.

Fluid driver 38 comprises a device to selectively move and discharge fluid from chamber 34 through nozzle 36. In one implementation, fluid driver 38 comprises a fluid ejection device such as a thermal inkjet resistor which nucleates fluid to create a bubble to forcefully expel or eject fluid through nozzle 36. In another implementation, fluid driver 38 comprises a fluid ejection device such as a piezo resistive device that changes shape or vibrates in response to applied electrical current to move a diaphragm to thereby eject adjacent fluid through nozzle 36. In still other implementations, fluid driver 38 may comprise other devices to selectively and forcibly eject fluid through nozzle 36. The ejection or expulsion of fluid within chamber 34 through nozzle 36 creates a void within the chamber 34 or a vacuum within chamber 34 which draws fluid into chamber 34 to fill the void, the fluid being drawn from microfluidic passage 24 through inlet 26 and across sensing zone 46. As the fluid is flowing through inlet 26 and across sensing zone 46, sensor 30 senses at least one characteristic of the fluid within sensing zone 46. As noted above, the constricted are smaller size of inlet 26 provides a sensing zone that provides enhanced sensing performance and resolution. At the same time, the constricted or smaller size of inlet 26 may be more susceptible to the collection or aggregation of particles within the fluid, wherein the aggregated particles may constrict or block flow of fluid through inlet 26.

Particle aggregation limiter (PAL) 42 limits or controls the aggregation or collection of particles within inlet 26 and within sensing zone 46. In one implementation, particle aggregation limiter 42 comprises passive filtering structures that filter particles that are larger than a predetermined size to inhibit such particles from entering inlet 26 where they may otherwise aggregate. For example, in one implementation, such filtering structures may comprise columns, porous materials through which fluid may flow and the like.

In one implementation, the filtering structures are provided between the sensing zone 46 and microfluidic passage 24, wherein particles are inhibited for flowing from passage 24 into inlet 26. In one implementation, the filtering structures are provided between the sensing zone 46 and nozzle 36, wherein particles are inhibited from flowing from chamber 34 back into inlet 26 where the particles may aggregate across the sensing zone 46. In addition, such filtering structures between inlet 26 and nozzle 36 further inhibit particles from moving to nozzle 36 and aggregating in or across nozzle 36. In some implementations, such filtering structures are provided on both the input side and the output side of inlet 26, on both sides of sensing zone 46 and sensor 30.

In one implementation, particle aggregation limiter 42 comprises an active structure or mechanism that dislodges particles within inlet 26, breaks up masses or aggregations of multiple particles within inlet 26 and moves particles out of inlet 26 and out of sense zone 46. In one implementation, particle aggregation limiter 42 comprises a microfluidic pump located between mouth 44 of inlet 26 and microfluidic passage 24. In one implementation, particle aggregation limiter 42 comprises a microfluidic pump located between outlet 45 and nozzle 36. In yet other implementations, particle aggregation limiter 42 comprises a microfluidic pump within inlet 26, within the sensing zone 46 itself.

In one implementation, the microfluidic pump serving as particle aggregation limiter 42 comprises an inertial pump. For purposes of this disclosure, the term "inertial pump" refers to a pumping device that initially drives fluid in both directions within a channel that is relatively narrow to the reservoirs it connects, but wherein the pumping device is asymmetrically positioned between the reservoirs such that the end result is fluid being driven in a direction towards the most distant of the two reservoirs. In one implementation, the microfluidic pump comprises a bubble jet inertial pump. In such an implementation, the bubble jet inertial pump produces an initially expanding bubble to move or drive adjacent fluid away from the bubble. One example of a bubble jet pump comprises a micro-heater or bubble jet resistor, such as a thermal inkjet (TIJ) pump. A TIJ pump may utilize at least one electrical resistor through which electric current is passed. The heat produced by the at least one resistor as electric current passes through the at least one resistor may vaporize or nucleate the fluid that is proximate to the resistors to create a bubble. As this bubble is initially created and expands, the bubble may initially drive adjacent fluid away from the bubble.

In other implementations, the microfluidic pump serving as particle aggregation limiter 42 may comprise other pumping devices. For example, in another implementation, the microfluidic pump may comprise a piezo-resistive inertial pump that changes shape or vibrates in response to applied electrical current to move a diaphragm to thereby move adjacent fluid to create flow across inlet 26 so as to move particles out of inlet 26. In yet other implementations, the microfluidic pump may comprise other microfluidic pumping devices in fluid communication with inlet 26.

In one implementation, the microfluidic pump or the multiple microfluidic pumps are actuated based upon a detection of the aggregation of particles within inlet 26 near or across sensing zone 46. In one implementation, the actuation of the microfluidic pump is based upon signals received from sensor 30. For example, sensor 30 may output signals indicating poor fluid flow through inlet 26, signals indicating a fluid flow rate less than a predefined threshold, the cause of which is likely the aggregation of particles within inlet 26. In response to such detected flow, the pump may be actuated to break up and/or move particles or aggregated particles out of the sensing zone 46 and out of inlet 26. In another implementation, an optical sensor may be provided which optically detects the aggregation of particles within inlet 26, wherein the microfluidic pump serving as particle aggregation limiter 42 is actuated in response to signals from the optical sensor or detector indicating an aggregation of particles above a predefined threshold.

In yet other implementations, the microfluidic pump serving as particle aggregation limiter 42 is automatically actuated on a predefined periodic basis or is automatically actuated based upon the cumulative number of tests completed by system 20, the cumulative amount or volume of fluid tested by system 20 and/or the cumulative amount or volume of fluid that has passed through the individual inlet 26 and the individual sensing zone 46.

In one implementation, the thresholds at which the microfluidic pump serving as particle aggregation limiter 42 is actuated vary based upon the type of fluid or the characteristics of the fluid being tested. For example, based upon signals from sensor 30, the controller of system 20 may detect a characteristic of the fluid being tested over time or identify the type of different fluids being tested over time. In such an implementation, controller may consult a lookup table or apply a formula based upon the detected characteristics of the fluid or types of fluid being tested to identify and apply a threshold that is appropriate or assigned to the detected characteristics of the fluid being tested over time, the identified type of different fluids being tested over time or the ratio or mixture of different fluids and their characteristics being tested by system 20 over time.

By controlling the aggregation of particles within sensing zone 46, either by inhibiting the aggregation of particles within sensing zone 46 or subsequently addressing any aggregation of particles within sensing zone 46 within active microfluidic pump, system 20 facilitates more reliable and consistent fluid flow through inlet 26 and across sensing zone 46. As a result, the performance of sensor 30 and system 20 is more robust and reliable.

Figure 2:
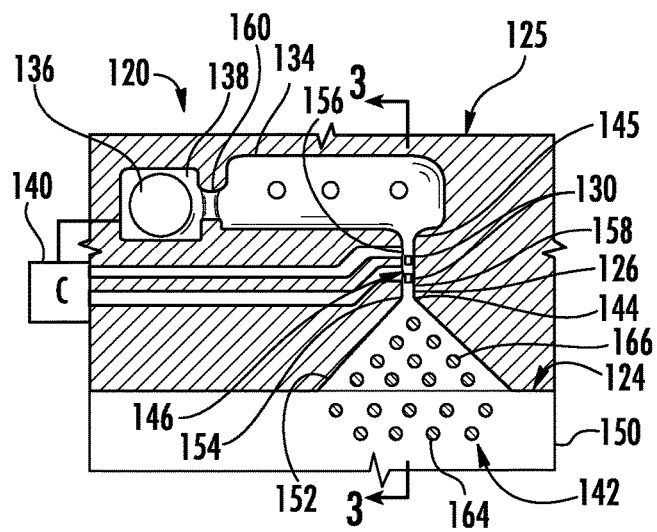
FIG. 2 is a sectional view of another example fluid sensing system.

FIG. 2 illustrates microfluidic sensing system 120, an example implementation of microfluidic sensing system 20. Microfluidic sensing system 120 comprises microfluidic passage 124, and multiple fluid sensing regions 125. Microfluidic passage 124 is similar to microfluidic passage 24 described above. Microfluidic passage 124 supplies samples of fluid to be tested to each of the multiple fluid sensing regions 125. In one implementation, microfluidic passage 124 is connected to a sample deposit or fill passage through which a fluid sample to be tested is supplied.

Microfluidic sensing regions 125 are identical to one another and extend on opposite sides of microfluidic passage 124. Although FIG. 2 illustrates two sensing regions 125 located directly opposite to one another on opposite sides of microfluidic passage 124, in other implementations, system 120 may include a greater number of such sensing regions or a single sensing region. In some implementations, the multiple sensing regions may all be located on one side of microfluidic passage 124 or may be staggered with respect to one another along opposite sides of microfluidic passage 124.

Each of sensing regions 125 comprises inlet 126, sensor 130, chamber 134, nozzle 136, fluid driver 138 and particle aggregation limiter 142, wherein sensing regions 125 are under the control of controller 140. Inlet 126 comprises a microfluidic passage extending from microfluidic passage 124 and connected to chamber 134. In the example illustrated, inlet 126 comprises funnel 152 and constriction 154. Funnel 152 comprises a funnel shaped fluid passage which is wider at microfluidic passage 124 and gradually tapers down to mouth 144 of constriction 154. In other implementations, funnel 152 may have curved sides rather than linear sides. In some implementations, funnel 152 may be omitted or may have other shapes that connect constriction 154 to microfluidic passage 124.

Constriction 154 of inlet 126 extends adjacent to or contains sensor 130 while defining a sensing zone 146, the zone in which the fluid is sensed by sensor 130. Inlet 126 is sized so as to have a smaller cross-sectional area than that a microfluidic passage 124 and that of chamber 134. In one implementation, constriction 154 has a cross-sectional area sized according to the expected dimensions of individual biological cells contained in the fluid being tested. For example, in one implementation, constriction 154 is dimensioned such that cells pass through constriction 154 of inlet 126 to chamber 134 in a serial fashion, facilitating enhanced sensing of the characteristics of the cells of the fluid as the cells do not overlap one another when being sensed.

In one implementation, constriction 154 of inlet 126 comprises a channel that has a smaller cross-sectional area than both adjacent regions of constriction 154, upstream and downstream of constriction 154. Constriction 154 has a cross-sectional area similar to that of the individual particles or cells that pass through constriction 154 and that are being tested. In one implementation in which the cells being tested have a general or average maximum data mention of 6 µm, inlet 126 has a cross-sectional area of 100 µm². In one implementation, inlet 126 has a sensing volume of 1000 µm³. For example, in one implementation, sensing zone 146 of inlet 126 has a sense volume having a length of 10 µm, a width of 10 µm and a height of 10 µm. In one implementation, inlet 126 has a width of no greater than 30 µm. The sizing or dimensioning of constriction 154 restricts the number of particles or individual cells that may pass through constriction 154 at any one moment, facilitating testing of individual cells or particles passing through constriction 154.

Sensor 130 comprises a micro-fabricated device within inlet 126 that senses characteristics of the fluid being tested. In one implementation, sensor 130 comprises a micro-device that is designed to output electrical signals or cause changes in electrical signals that indicate properties, parameters or characteristics of the fluid and/or cells/particles of the fluid passing through constriction 154 of inlet 126. In one implementation, sensor 130 comprises an impedance sensor which outputs signals based upon changes in electrical impedance brought about by differently sized particles or cells flowing through inlet 126 and impacting impedance of the electrical field across or within inlet 126. In the example illustrated, sensor 130 comprises an electrically charged high side electrode 156 and a low side electrode 158 formed within or integrated within a surface of inlet 126 within inlet 126. In one implementation, the low side electrode is electrically grounded. In another implementation, the low side electrode is a floating low side electrode.

Chamber 134 comprises a volume into which fluid flows after having been sensed or detected by sensor 130 within sensing zone 146. Chamber 134 contains or surrounds nozzle 136 and fluid driver 138. In the example illustrated, chamber 134 comprises a constriction 160 through which fluid must flow to reach nozzle 136. Constriction 160 inhibits particles too large for the opening of nozzle 136 from reaching nozzle 136 and occluding nozzle 136. In other implementations, constriction 160 may be omitted. Nozzle 136 is connected to chamber 134 and comprise an opening through which fluid within chamber 34 is ejected. In one implementation, nozzle 136 opens into or directs ejected fluid into a waste reservoir 162 (shown in FIG. 3).

Fluid driver 138 comprises a device to selectively move and discharge fluid from chamber 134 through nozzle 136. In the example illustrated, fluid driver 138 comprises a fluid ejection device such as a thermal inkjet resistor which nucleates fluid to create a bubble to forcefully expel or eject fluid through nozzle 136. In another implementation, fluid driver 138 comprises a fluid ejection device such as a piezo resistive device that changes shape or vibrates in response to applied electrical current to move a diaphragm to thereby eject adjacent fluid through nozzle 136. In still other implementations, fluid driver 138 may comprise other devices to selectively and forcibly eject fluid through nozzle 136. The ejection or expulsion of fluid within chamber 134 through nozzle 136 creates a void within the chamber 134 or a vacuum within chamber 134 which draws fluid into chamber 134 to fill the void, the fluid being drawn from microfluidic passage 124 through constriction 154 of inlet 126 and across sensing zone 146. As the fluid is flowing through inlet 126 and across sensing zone 146, sensor 130 senses one or more characteristics of the fluid within sensing zone 146. Signals from sensor 130 are transmitted to controller 140. As noted above, the constricted or smaller size of inlet 126 provides a sensing zone that provides enhanced sensing performance and resolution. At the same time, the constricted or smaller size of constriction 154 may be more susceptible to the collection or aggregation of particles within the fluid, wherein the aggregated particles may constrict or block flow of fluid through inlet 126.

Controller 140 receives signals from sensor 130 and determines fluid flow, characteristics of the fluid and/or characteristics of the cells or particles within the fluid based upon such signals. Controller 140 comprises a processing unit and associated non-transient computer-readable medium containing instructions for the processing unit to carry out the counting or determination of the number of cells or particles within the fluid, or other characteristics of the fluid and/or characteristics of the cells or particles within the fluid based upon the signals received from sensor 130 of each of sensing regions 125. In one implementation, controller 140 additionally controls the actuation of fluid driver 138 of each of sensing regions 125.

For purposes of this application, the term "processing unit" shall mean a presently developed or future developed device that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 140 may be embodied as part of one or more application-specific integrated circuits (ASICs). Unless otherwise specifically noted, the controller is not limited to any specific combination of hardware circuitry and software, nor to any particular source for the instructions executed by the processing unit.

Particle aggregation limiter (PAL) 142 limits or controls the aggregation or collection of particles within inlet 126 and within sensing zone 146. In the example illustrated, particle aggregation limiter 142 comprises passive filtering structures 164, 166 that filter particles that are larger than a predetermined size to inhibit such particles from entering constriction 154 of inlet 126 where they may otherwise aggregate. In the example illustrated, the filtering structures 164, 166 are provided between the sensing zone 146 and microfluidic passage 124, wherein particles are inhibited from flowing from passage 124 into constriction 154 of inlet 126. Filtering structures 164 extend within microfluidic passage 124. Filtering structures 166 extend within funnel 152. In one implementation, filtering structures 164 comprise columns or posts that are spaced from one another between 5 µm and 20 µm and nominally between 7 µm and 20 µm.

Figure 3:
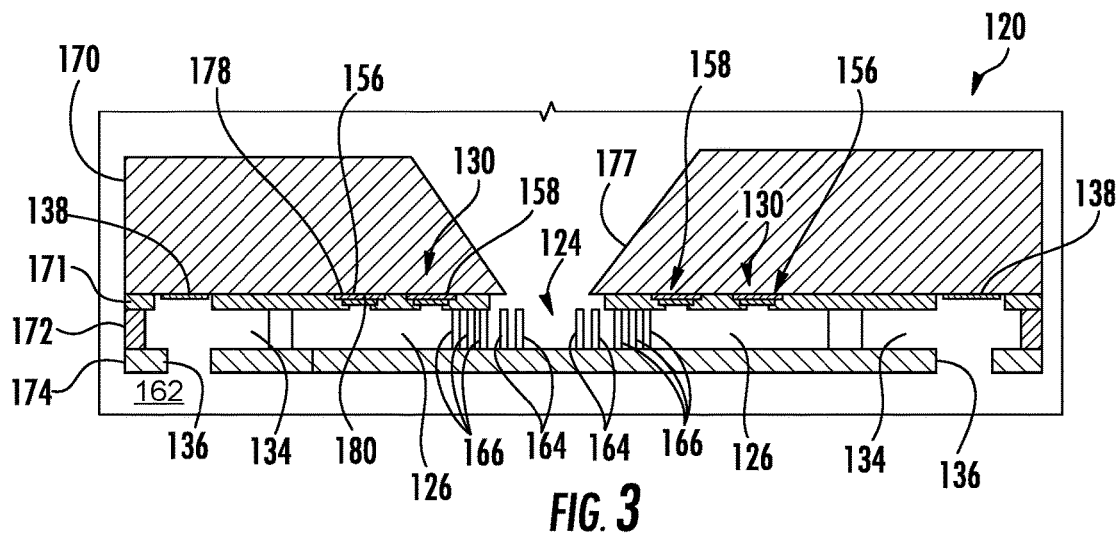
FIG. 3 is a sectional view of the example fluid sensing system of FIG. 2 taken along line 3-3.

FIG. 3 is a sectional view through a portion of microfluidic sensing system 120 illustrating one example construction of system 120. As shown by FIG. 3, the example system 120 is formed by four layers: layer 170 (e.g. a first layer 170), layer 171, layer 172 (e.g. a third layer 172) and layer 174 (e.g. a second layer 174). Layer 170, sometimes referred to as the "shelf," comprises a layer of material upon which the remaining layers are deposited and patterned, prior to the structure being inverted as shown in FIG. 3. Layer 170 further serves as a substrate upon which the electrodes forming sensor 130 and thermal inkjet resister of fluid driver 138 are formed. As shown by FIG. 3, layer 170 includes a slot 177 extending their through. Slot 177 provides a passage through which fluid flows to microfluidic passage 124.

In one implementation, layer 170 comprises a layer of bulk silicon. In other implementations, layer 170 may be formed from, or may comprise, other materials or combinations of materials. As shown by FIG. 3, in the example illustrated, each of electrodes 156, 158, forming the sensor 130 comprises a layer 178 of tantalum upon layer 170 and a layer of gold 180 upon the layer 178 of tantalum. In other implementations, such electrodes 156, 158, forming sensor 130 may be formed from, or may comprise, a wide variety of materials such as Au, Ag, AgCl, Pt, Ta and the like.

Layer 171 comprises a layer of material that facilitates bonding or joining of the material of layer 174 to layer 170. In the example illustrated in which layer 174 comprises SU-8 (Bisphenol A novolac epoxy that has been dissolved in organic solvent such as gamma butylaractone GBL or cyclopentanone), layer 172 comprises silicon carbide. In other implementations, layers 172 may have other compositions or may be omitted.

Layer 172 comprises a layer of material deposited and patterned upon layer 171. Layer 172 forms and provides funnel 152, inlet 126, chamber 130 and structures 164, 166. As shown by FIG. 3, structures 164 stand upright from layer 174 within fluid passage 124 below slot 177. Structures 166 extend from the floor to a ceiling within funnel 152. In one implementation, layer 172 comprises a layer of transparent photoresist material such as an epoxy-based negative photoresist such as SU-8 (Bisphenol A novolac epoxy that has been dissolved in organic solvent such as gamma butylaractone GBL or cyclopentanone).

Layer 174 serves as a nozzle plate forming a floor below each of microfluidic passage 124, inlet 126 and chamber 134. Layer 174 includes openings which form nozzles 136. Nozzles 136 extend through layer 174 generally opposite to the resister of fluid driver 138. Nozzle 136 opens into waste reservoir 162 formed by layer 174. In one implementation, layer 174 comprises a layer of transparent photoresist material such as an epoxy-based negative photoresist such as SU-8 (Bisphenol A novolac epoxy that has been dissolved in organic solvent such as gamma butylaractone GBL or cyclopentanone). In other implementations, microfluidic sensing system 120 may be formed from, or may comprise, an alternative arrangement of layers using the same or different combinations of materials.

In one implementation, microfluidic sensing system 120 is formed by selectively depositing and patterning the layers of materials upon layer 170 so as to form layer 170, the resistors of fluid driver 138, the electrodes of sensors 130. Thereafter, layer 172 is selectively deposited, such as through spins coating, and patterned, such as through photolithography, to form passage 124, inlets 126, chambers 134 and structures 164, 166 on top of layer 171. Passage 124, inlets 126 and chambers 134 within layer 172 are filled with a sacrificial material, such as wax, which is planarized. Thereafter, layer 174 is deposited or applied over the planarized sacrificial material and in connecting contact with portions of layer 172 forming the walls of chamber 134 and inlet 126 as well as the ends of structures 164, 166. Layer 170 subsequently undergoes etching or other material removal processes to form slot 177 while layer 174 also undergoes etching or other material removal processes to form nozzles 136. The sacrificial material is removed, leaving the completed microfluidic passage 124, inlets 126 and chambers 134. In implementations where the sacrificial material comprises wax, the waxes melted and withdrawn through nozzles 136 and/or slot 177. In yet other implementations, microfluidic sensing system 120 may be formed utilizing other fabrication processes.

Figure 4:
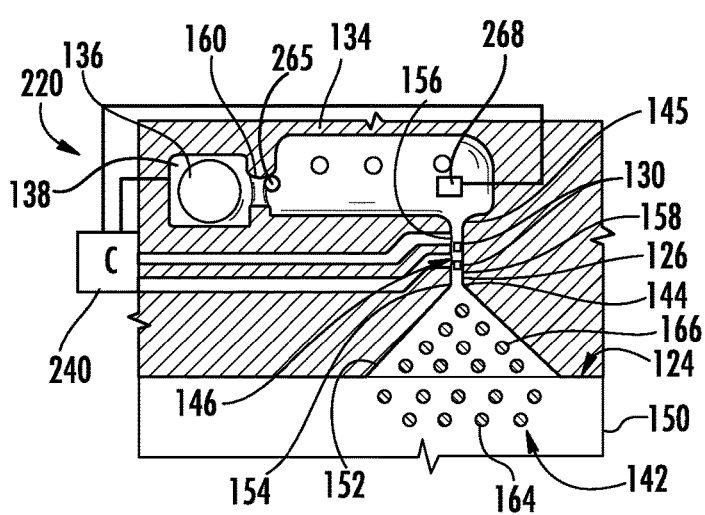
FIG. 4 is a sectional view of another example fluid sensing system.

FIG. 4 illustrates microfluidic sensing system 220, another example implementation of microfluidic sensing system 20. Microfluidic sensing system 220 is similar to microfluidic sensing system 120 except the microfluidic sensing system 220 additionally comprises filtering structure 265, additionally comprises microfluidic inertial pump 268 and comprises controller 240 in place of controller 140. Those remaining components of system 220 which correspond to components of system 120 are numbered similarly. In one implementation, system 220 is formed utilizing layers 170, 171, 172 and 174 described above with respect to FIG. 3. In other implementations, system 220 may be formed from, or may comprise, other combinations of layers or materials.

Filtering structure 265 is similar to the individual filtering structures 166 except that filtering structure 265 is formed in layer 170 proximate to constriction 160 between outlet 158 and nozzle 136. Filtering structure 265 blocks or inhibits particles within chamber 134 from flowing into nozzle 136 or onto fluid driver 138. In other implementations, filtering structure 265 may be omitted.

Microfluidic inertial pump 268 serves as an additional particle aggregation limiter. Inertial pump 268 dislodges particles within constriction 154 of inlet 126, breaks up masses or aggregations of multiple particles within inlet 126 and moves particles out of inlet 126 and out of sense zone 146. In the example illustrated, microfluidic pump 268 is located between chamber side mouth 145 and nozzle 136. In the example illustrated, microfluidic pump comprises a bubble jet inertial pump. In one implementation, the bubble jet inertial pump has maximum dimensions of between 5 µm and 15 µm. In one implementation, the bubble jet inertial pump comprises a 15 µm×15 µm resister. In such an implementation, the bubble jet inertial pump produces an initially expanding bubble to move or drive adjacent fluid away from the bubble. One example of a bubble jet pump comprises a micro-heater, such as a thermal inkjet (TIJ) pump. A TIJ pump may utilize at least one electrical resistor through which electric current is passed. The heat produced by the at least one resistor as electric current passes through the at least one resistor may vaporize or nucleate the fluid that is proximate to the resistors to create a bubble. As this bubble is initially created and expands, the bubble may initially drive adjacent fluid away from the bubble through and out of constriction 154 of inlet 126.

In other implementations, the microfluidic pump 268, serving as particle aggregation limiter 42, may comprise other pumping devices. For example, in another implementation, the microfluidic pump may comprise a piezo-resistive inertial pump that changes shape or vibrates in response to applied electrical current to move a diaphragm to thereby move adjacent fluid to create flow across inlet 126 so as to move particles out of inlet 126. In yet other implementations, the microfluidic pump may comprise other microfluidic pumping devices in fluid communication with inlet 126.

Controller 240 is similar to controller 140 except the controller 240 is additionally directed, by instructions contained within a non-transient computer-readable medium, to control the actuation of pump 268. In one implementation, controller 240 actuates pump 268 automatically on a predefined periodic basis or is automatically actuated based upon the cumulative number of tests completed by system 220, the cumulative amount or volume of fluid tested by system 220 and/or the cumulative amount or volume of fluid that has passed through the individual inlet 126 and the individual sensing zone 146.

In one implementation, the thresholds at which the microfluidic pump 268 is actuated vary based upon the type of fluid or the characteristics of the fluid being tested. For example, based upon signals from sensor 130, controller 240 may detect a characteristic of the fluid being tested over time or identify the type of different fluids being tested over time. In such an implementation, controller 240 may consult a lookup table or apply a formula based upon the detected characteristics of the fluid or types of fluid being tested to identify and apply a threshold that is appropriate or assigned to the detected characteristics of the fluid being tested over time, the identified type of different fluids being tested over time or the ratio or mixture of different fluids and their characteristics being tested by system 220 over time.

In another implementation or according to another user selectable mode of operation for system 220, controller 240 automatically actuates pump 268 based upon a detection of the aggregation of particles within inlet 126 near or across sensing zone 146. In one implementation, the actuation of the microfluidic pump 268 is based upon signals received from sensor 130. For example, sensor 130 may output signals indicating poor fluid flow through inlet 226, signals indicating a fluid flow rate less than a predefined threshold, the cause of which is likely the aggregation of particles within inlet 226. In response to such detected fluid flow, the pump may be actuated to break up and/or move particles or aggregated particles out of the sensing zone 246 and out of constriction 154 of inlet 226. In another implementation, an optical sensor may be provided which optically detects the aggregation of particles within constriction 154 of inlet 26, wherein the microfluidic pump serving as particle aggregation limiter 42 is actuated in response to signals from the optical sensor or detector indicating an aggregation of particles above a predefined threshold.

FIG. 5 is a flow diagram illustrating an example method 300 which may be carried out by system 220. As indicated by block 302, controller 240 outputs control signals causing fluid driver 138 to eject fluid from chamber 134 through nozzle 136 to draw fluid into chamber 134 from fluid passage 124 across sensing zone 146. As indicated by block 304, sensor 130 senses characteristics and/or flow of fluid within sensing zone 146. Such signals from sensor 130 are transmitted to controller 240 for diagnostics or analysis.

As indicated by block 306, controller 240 further detects the level of particle aggregation in sensing zone 146. In one implementation, controller 240 detects and determines the level or degree of particle aggregation within zone 46 using signals received from sensor 130. As noted above, in one implementation, a reduced level of fluid flow below a predefined threshold level within inlet 126 may indicate an unacceptable level of particle aggregation. In other implementations, a separate sensor, such as an optical sensor, may be used to detect particle aggregation in zone 46. As indicated by block 308, in response to detecting particle aggregation, controller 240 actuates inertial pump 268 adjacent zone 146 so as to eject aggregated particles from sensing zone 146.

FIG. 6 illustrates microfluidic sensing system 420, another example implementation of microfluidic sensing system 20. Microfluidic sensing system 420 is similar to microfluidic sensing system 220 except the microfluidic sensing system 420 additionally comprises inertial sensor 430 and pumps 468, 469. Those remaining components of microfluidic sensing system 420 which correspond to components of microfluidic sensing system 220 are numbered similarly. In one implementation, system 420 is formed utilizing layers 170, 171, 172 and 174 described above with respect to FIG. 3. In other implementations, system 420 may be formed from, or may comprise, other combinations of layers or materials.

Sensor 430 comprises a sensor that detects the accumulation or aggregation of particles within funnel 152 of inlet 126. Sensor 430 outputs signals that are transmitted to controller 240, wherein the signals indicate the collection of particles or the entrapment of particles by features 166. Although one sensor 430 is illustrated, in other implementations, system 420 may comprise multiple such sensors 430 spaced within the array of features 166.

Microfluidic inertial pump 468 and 469 are each similar to microfluidic inertial pump 268 but for their locations. Microfluidic inertial pump 468 is located proximate to mouth 144 in funnel 152 between mouth 144 and filtering structures 166. Upon being actuated, pump 468 drives fluid through inlet 126 towards chamber 134 to dislodge, break up and move particles that have aggregated within inlet 26.

Microfluidic inertial pump 469 is located within funnel 152 proximate to main distribution channel 150 of fluid passage 124, between filtering structures 164 and 166. In the example illustrated, pump 469 is located adjacent to the mouth or inlet side of funnel 152. Upon being actuated, pump 469 pushes or moves particles within funnel 152 out of funnel 152. In circumstances, pump 469 may break up or dislodge particles aggregated upon filtering structures 166.

As with system 220, controller 240 of system 420 selectively actuates pumps 268, 468 and/or 469. In one implementation, controller 240 selectively actuates pumps 268, 468 and 469 based upon a determination of particle aggregation within inlet 26 and/or particle aggregation and accumulation within funnel 152. In one implementation, controller 240 actuates pumps 468, 469 based upon signals from sensor 430. In one implementation, controller 240 actuates pumps 468, 469 based upon signals from sensor 130 or based upon a combination of signals from both of sensors 130 and 430.

In one implementation, the actuation of pumps 268, 468 and 469 is performed sequentially such that the different fluid flows produced by the actuation of pumps 268, 468 and 469 do not interfere with one another. For example, in one implementation, controller 240 may actuate pump 268 to drive aggregated particles from inlet 126 into funnel 152. Thereafter, controller 240 actuates pump 469 further move such particles within funnel 152 further away from inlet 126, into main distribution channel 150. In other implementations, controller 240 may alternately actuate pump 268 and 468 to exert force upon aggregated particles within inlet 26 in opposite directions to facilitate dislodgment and breakup of the particle aggregation prior to actuating just one of pumps 268, 468 to drive the broken off particle aggregations out of inlet 126.

FIG. 7 illustrates microfluidic sensing system 520, another implementation of microfluidic sensing system 20. Microfluidic sensing system 520 is similar to microfluidic sensing system 420 except that system 520 utilizes a pair of fluid ejection devices draw fluid across sensing zone 146. System 520 comprises chamber 534, nozzles 536A, 536B and fluid drivers 538, 538. In the example illustrated, system 520 omits inertial pump 469. Those remaining components of system 520 which correspond to components of system 420 are numbered similarly. In one implementation, system 520 is formed utilizing layers 170, 171, 172 and 174 described above with respect to FIG. 3. In other implementations, system 520 may be formed from, or may comprise, other combinations of layers or materials.

Chamber 534 is similar to chamber 134 except that chamber 534 contains nozzle 536A, fluid driver 538A on one end and a nozzle 536B and fluid driver 538B on another opposite end. The chamber side mouth 145 of inlet 126 is centrally located between the opposite ends of chamber 534. In the example illustrated, the chamber side mouth 145 of inlet 126 is equidistantly spaced from the opposite ends of chamber 534. Similar to chamber 134, chamber 534 additionally comprises filtering structures 565A and 565B adjacent to corresponding constrictions 560A and 560B leading to nozzle 536A and 5368B, respectively. In other implementations, filtering structures 565A, 565B may be omitted. Likewise, in some implementations, filtering structures 164 and/or 166 may be omitted.

Controller 240 outputs control signals actuating fluid drivers 536A, 536B to jet or expel fluid from chamber 534 through nozzles 538A, 538B so as to draw fluid from microfluidic passage 124 into chamber 534 across inlet 126. In one implementation, controller 240 outputs control signals substantially simultaneously actuating or initiating fluid drivers 536A, 536B. In another implementation, controller 240 sequentially actuates or initiates fluid drivers 536A, 536B. As with system 420, in one implementation, controller 240 actuates inertial pumps 268, 468 to facilitate cleaning of particles that may have aggregated within inlet 126. Actuation of pump 268 drives fluid from chamber 534 towards fluid passage 124 through inlet 126. Actuation of pump 468 drives fluid from funnel 152 towards chamber 534 through inlet 126. In one implementation, pumps 268, 468 are sequentially and alternately actuated to dislodge particles within inlet 126.

As with system 240, controller 240 may also actuate pumps 268, 468 in an automatic periodic fashion or automatically in response to a detected degree or level of occlusion or blockage of inlet 126 by particles that have aggregated within inlet 126. In one implementation, controller 240 control the timing at which pumps 268, 468 are actuated so as to not interfere with the actuation of fluid drivers 538. For example, in one implementation, actuation of fluid drivers 538 (bubble jet resistors) creates an expanding bubble which subsequently collapses draw fluid into chamber 534 across inlet 126. Likewise, actuation of pump 268, 468 also creates an expanding bubble which subsequently collapses. In such an implementation, controller 240 does not actuate pump 268 while fluid is being drawn into chamber 534 as the bubble created by either of fluid drivers 538 is collapsing. In one implementation, controller 240 may actuate inertial pump 468 while the bubble or bubbles created by the actuation of fluid drivers 538 (bubble jet resistors) are collapsing such that fluid moving through inlet 126 and across sensing zone 146 has an accelerated or enhanced velocity as a result of the fluid (A) being drawn by the collapse of the bubbles created by the actuation of fluid drivers 538 and (B) being pushed by the expansion of the bubble created by the actuation of inertial pump 468.

Figure 8:
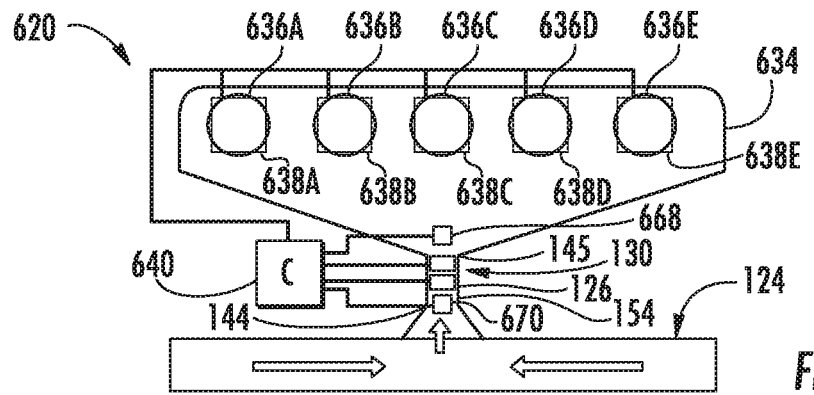
FIG. 8 is a schematic diagram of another example fluid sensing system.

FIG. 8 illustrates microfluidic sensing system 620, another example implementation of microfluidic sensing system 20 described above. Like microfluidic sensing system 520, microfluidic sensing system 620 includes multiple nozzle-fluid driver pairs within the chamber to draw fluid across the sensing zone into the chamber. However, unlike system 520, microfluidic sensing system 620 comprises at least three nozzle-fluid driver pairs. System 620 comprises a first nozzle and associated fluid driver at one end of the chamber, a second nozzle and associated fluid driver at an opposite end of the chamber and a third nozzle and associated fluid driver at a center or intermediate location in the chamber. As a result, system 620 draws fluid across the sensing zone to each of multiple spaced locations across substantially an entirety of the length of the chamber.

Microfluidic sensing system 620 comprises microfluidic passage 124, inlet 126, sensor 130, chamber 634, nozzles 636A, 636B, 636C, 636D and 636E (collectively referred to as nozzles 636), fluid drivers 638A, 638B, 638C, 638E and 638E (collectively referred to as fluid drivers 638), controller 640 and inertial pumps 668, 670 serving as particles aggregation limiters. Microfluidic passage 124, inlet 126 and sensor 130 are described above. In one implementation, system 620 is formed utilizing layers 170, 171, 172 and 174 described above with respect to FIG. 3. In other implementations, system 620 may be formed from, or may comprise, other combinations of layers or materials.

Chamber 634 comprises a volume into which fluid flows after having been sensed or detected by sensor 130 within sensing zone 146. Chamber 134 contains or surrounds nozzles 636 and fluid drivers 638. As shown by FIG. 8, chamber 634 gradually tapers to outlet 145 of inlet 126. Chamber 634 fans out from inlet 126.

Nozzles 636 are are connected to chamber 634, wherein each of nozzles 636 comprises an opening through which fluid within chamber 634 is ejected. In one implementation, each of nozzles 636 opens into or directs ejected fluid into a waste reservoir 162 (shown in FIG. 3).

Fluid drivers 638 comprise devices to selectively move and discharge fluid from chamber 634 through associated nozzles 636. In the example illustrated, fluid driver 138 comprises a fluid ejection device such as a thermal inkjet or bubble jet resistor which nucleates fluid to create a bubble to forcefully expel or eject fluid through and associated nozzle 636. In another implementation, fluid drivers 638 each comprises a fluid ejection device such as a piezo resistive device that changes shape or vibrates in response to applied electrical current to move a diaphragm to thereby eject adjacent fluid through nozzle 636. In still other implementations, fluid driver 638 may comprise other devices to selectively and forcibly eject fluid through nozzle 636.

The ejection or expulsion of fluid within chamber 634 through the associated nozzle 636 creates a void within the chamber 634 or a vacuum within chamber 634 which draws fluid into chamber 634 to fill the void, the fluid being drawn from microfluidic passage 124 through inlet 126 and across sensing zone 146. As the fluid is flowing through inlet 126 and across sensing zone 146, sensor 130 senses one or more characteristics of the fluid within sensing zone 146. Signals from sensor 130 are transmitted to controller 640. As noted above, the constricted or smaller size of inlet 126 provides a sensing zone that provides enhanced sensing performance and resolution. At the same time, the constricted or smaller size of constriction 154 of inlet 126 may be more susceptible to the collection or aggregation of particles within the fluid, wherein the aggregated particles may constrict or block flow of fluid through inlet 126.

Controller 640 receives signals from sensor 130 and determines the number of cells or particles within the fluid. In other implementations, controller 64 may determine other characteristics of the fluid and/or characteristics of the cells or particles within the fluid based upon such signals. Controller 140 comprises a processing unit and associated non-transient computer-readable medium containing instructions for the processing unit to carry out the determination of fluid flow, characteristics of the fluid and/or characteristics of the cells or particles within the fluid based upon the signals received from sensor 130.

In one implementation, controller 640 additionally controls the actuation of fluid drivers 638. In one implementation, controller 640 sequentially actuates fluid drivers 638. In one implementation, controller 640 sequentially actuates first and second fluid drivers or first and second sets of fluid drivers such that an expanding bubble from actuation of the first fluid driver or the bubbles from the actuation of the first set of fluid drivers do not intersect an expanding bubble from actuation of the second fluid driver or the second set of fluid drivers. In one implementation, the actuation of the first fluid driver 638 creates a positive pressure during a first time in a first region within the chamber proximate to the first nozzle to push fluid through the first nozzle followed by a negative pressure during a second time in the region to draw fluid to the first region, wherein actuation of the second fluid driver 638 creates a positive pressure during a third time in a second region within the chamber proximate the second nozzle to push fluid through the second nozzle followed by a negative pressure during a fourth time in the second region to draw fluid to the second region and wherein the controller 640 sequentially actuates the second fluid driver following actuation of the first fluid driver following an end of the first time and before expiration of the second time.

Similar to controller 240 in microfluidic sensing system 520, controller 640 in microfluidic sensing system 620 actuates inertial pumps 668, 670 to facilitate cleaning of particles that may have aggregated within inlet 126. Actuation of pump 668 drives fluid from chamber 634 towards fluid passage 124 through inlet 126. Actuation of pump 670 drives fluid from funnel 152 towards chamber 634 through inlet 126. In one implementation, pumps 668, 670 are sequentially and alternately actuated to dislodge particles within inlet 126.

Controller 640 may also actuate pumps 668, 670 in an automatic periodic fashion or automatically in response to a detected degree or level of occlusion or blockage of inlet 126 by particles that have aggregated within inlet 126. In one implementation, controller 640 controls the timing at which pumps 668, 670 are actuated so as to not interfere with the actuation of fluid drivers 638. For example, in one implementation, actuation of fluid drivers 638 (bubble jet resistors) creates an expanding bubble which subsequently collapses draw fluid into chamber 634 across inlet 126. Likewise, actuation of pump 668, 670 also creates an expanding bubble which subsequently collapses. In such an implementation, controller 640 does not actuate pump 668 while fluid is being drawn into chamber 634 as the bubble created by any of fluid drivers 638 is collapsing. In one implementation, controller 640 may actuate inertial pump 670 while the bubble or bubbles created by the actuation of fluid drivers 638 (bubble jet resistors) are collapsing such that fluid moving through inlet 126 and across sensing zone 146 has an accelerated or enhanced velocity as a result of the fluid (A) being drawn by the collapse of the bubbles created by the actuation of fluid drivers 638 and (B) being pushed by the expansion of the bubble created by the actuation of inertial pump 670.

Figure 9:
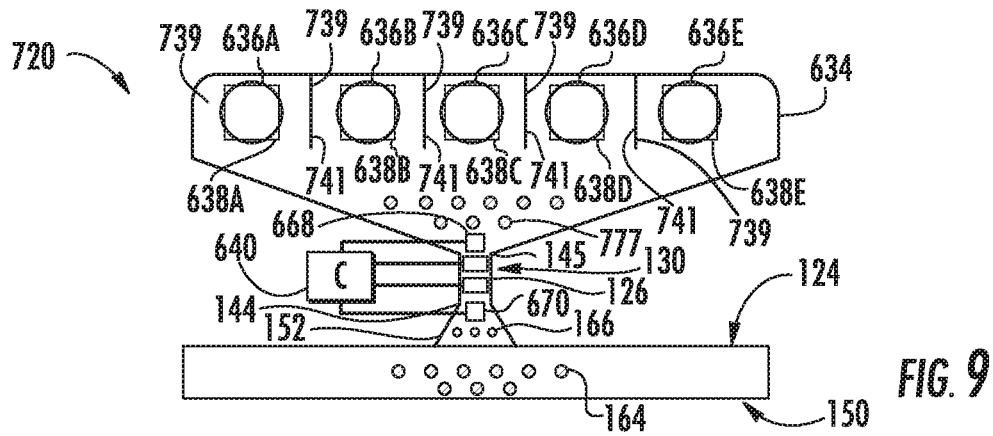
FIG. 9 is a schematic diagram of another example fluid sensing system.

FIG. 9 illustrates microfluidic sensing system 720, another example implementation of microfluidic sensing system 20. Microfluidic sensing system 720 is similar to microfluidic sensing system 620 described above except that microfluidic sensing system 720 additionally comprises stalls 739, filter structures 164, filter structures 166 and filter structures 777. Those remaining components or elements of system 720 which correspond to components or elements of system 620 are numbered similarly. In one implementation, system 720 is formed utilizing layers 170, 171, 172 and 174 described above with respect to FIG. 3. In other implementations, system 720 may be formed from, or may comprise, other combinations of layers or materials.

Stalls 739 comprise isolated regions formed by partitioning walls or structures 741 extending between consecutive nozzles 636 and their associated fluid drivers 638. Partitioning structures 741 have a length of at least half the diameter of nozzles 636 and nominally equal to or greater than the diameter of each of nozzles 636. Stalls 739 isolate fluid driver 738 from one another such that the bubble or positive pressure fluid resulting from the actuation of one fluid driver 738 has a lessened or limited impact or interference with the bubble or positive pressure fluid resulting from an adjacent or consecutive fluid driver 738. Stalls 739 facilitate closer sequential actuation of fluid drivers 638. In some implementations, stalls 739 may be omitted.

Filter structures 164, 166 are described above with respect to system 120 and comprise columns or posts that filter particles within the fluid. Filter structures 164 are located within fluid passage 124 while filter structures 166 are located within funnel 152 of inlet 126. Filter structures 777 are each similar to filter structures 166 but for their location. Filter structures 777 extend between chamber side mouth 145 of inlet 126 and nozzles 636. Similar to filter structures 166, filter structures 777 comprise columns or posts extending from the floor to the ceiling and layer 172 (shown in FIG. 3). Filter structures 777 inhibit the transfer of particles that are passed through inlet 126 further to nozzles 638 where such particles may clog nozzles 638. Moreover, filter structures 777 capture and retain particles that are passed through inlet 126 to inhibit such particles from being drawn or pushed back into inlet 126, such as when bubbles from the actuation of fluid driver 638 are expanding.

Figure 10:
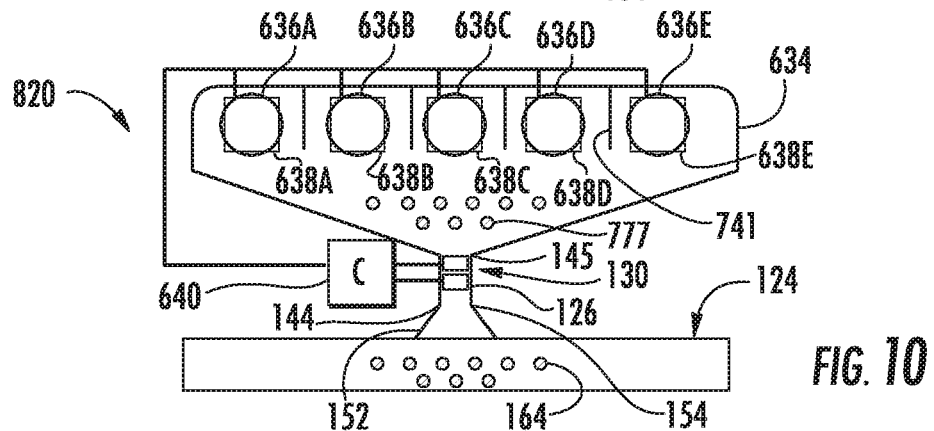
FIG. 10 is a schematic diagram of another example fluid sensing system.

FIG. 10 illustrates microfluidic sensing system 820, another example implementation of microfluidic sensing system 20. Microfluidic sensing system 820 is similar to microfluidic sensing system 720 except the microfluidic sensing system 820 omits inertial pumps 668, 670 and omits filter structures 166. Those remaining components or elements of system 820 which correspond to systems or components of system 720 are numbered similarly.

Figure 11:
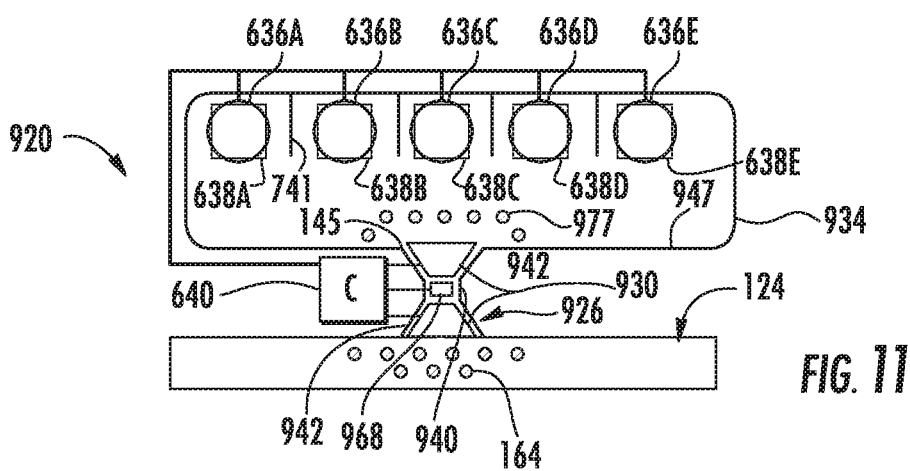
FIG. 11 is a schematic diagram of another example fluid sensing system.

FIG. 11 illustrates microfluidic sensing system 920, another example implementation of microfluidic sensing system 20. Microfluidic sensing system 920 is similar to microfluidic sensing system 720 except that system 920 comprises inlet 926, sensor 930, chamber 934, filtering structures 977 and microfluidic inertial pump 968 in place of inlet 126, sensor 130, chamber 634 and filtering structures 777 and pumps 668, 670, respectively. As shown by FIG. 11, system 920 omits filtering structures 166. Those remaining elements or structures corresponding to elements or components of system 720 are numbered similarly.

Inlet 926 is similar to inlet 126 except that inlet 926 contains microfluidic inertial pump 968 and has an hourglass shape. Inlet 926 comprises a central constriction region 940 which contains pump 968 and two opposite funnel regions 942 which contain different portions of sensor 930. In the example illustrated, sensor 930 comprise an impedance sensor, wherein one of portions 942 is adjacent to an electrically charged high side electrode and the other of portions 942 is adjacent to a low side electrode formed within or integrated within a surface of inlet 926 within inlet 926. In one implementation, the low side electrode is electrically grounded. In another implementation, the low side electrode is a floating low side electrode.

Chamber 934 is similar to chamber 634 except the chamber 934 is rectangular, the inner wall 947 of chamber 934 being equally spaced from the center point of each of nozzles 638 across the width of chamber 934. As a result, chamber 934 provides an enlarged void or dead space between each of the fluid drivers 636 and the chamber side mouth 145 of inlet 926. This enlarged void or dead space reduces the likelihood that the expanding bubbles or regions of high pressure fluid during the sequential actuation of fluid drivers 636 will interfere or intersect with one another. As a result, fluid drivers 636 may be actuated closer in time for drawing fluid across sensing zone 946 of inlet 926 at a higher rate. In other implementations, chamber 934 may have other shapes, such as being shaped similar to chamber 634.

Filter structures 977 are similar to filter structures 777 described above but for their arrangement within chamber 934. Filter structures 977 comprise columns or posts extending over and about mouth 145 to inhibit the transfer of particles to nozzles 636. Filter section 977 further inhibit particles that have moved into chamber 934 from being moved back into inlet 926.

Inertial pump 968 is similar to inertial pump 468 except that inertial pump 968 is located within inlet 926 between the two electrodes of sensor 930. Inertial pump 968 is located within constriction region 940 of inlet 926. Actuation of inertial pump 940 drives fluid and aggregated particles in both directions, towards chamber 934 and towards microfluidic passage 124. Once such particles have been pushed into chamber 934, such particles become entrapped by structure 977. Particles moved into passage 124 become entrapped by structures 164, inhibiting such particles from reentering constriction 154 of inlet 926. Because inertial pump 968 is centrally located within inlet 926, inertial pump 968 may more effectively discharge particles from inlet 926.

Figure 12:
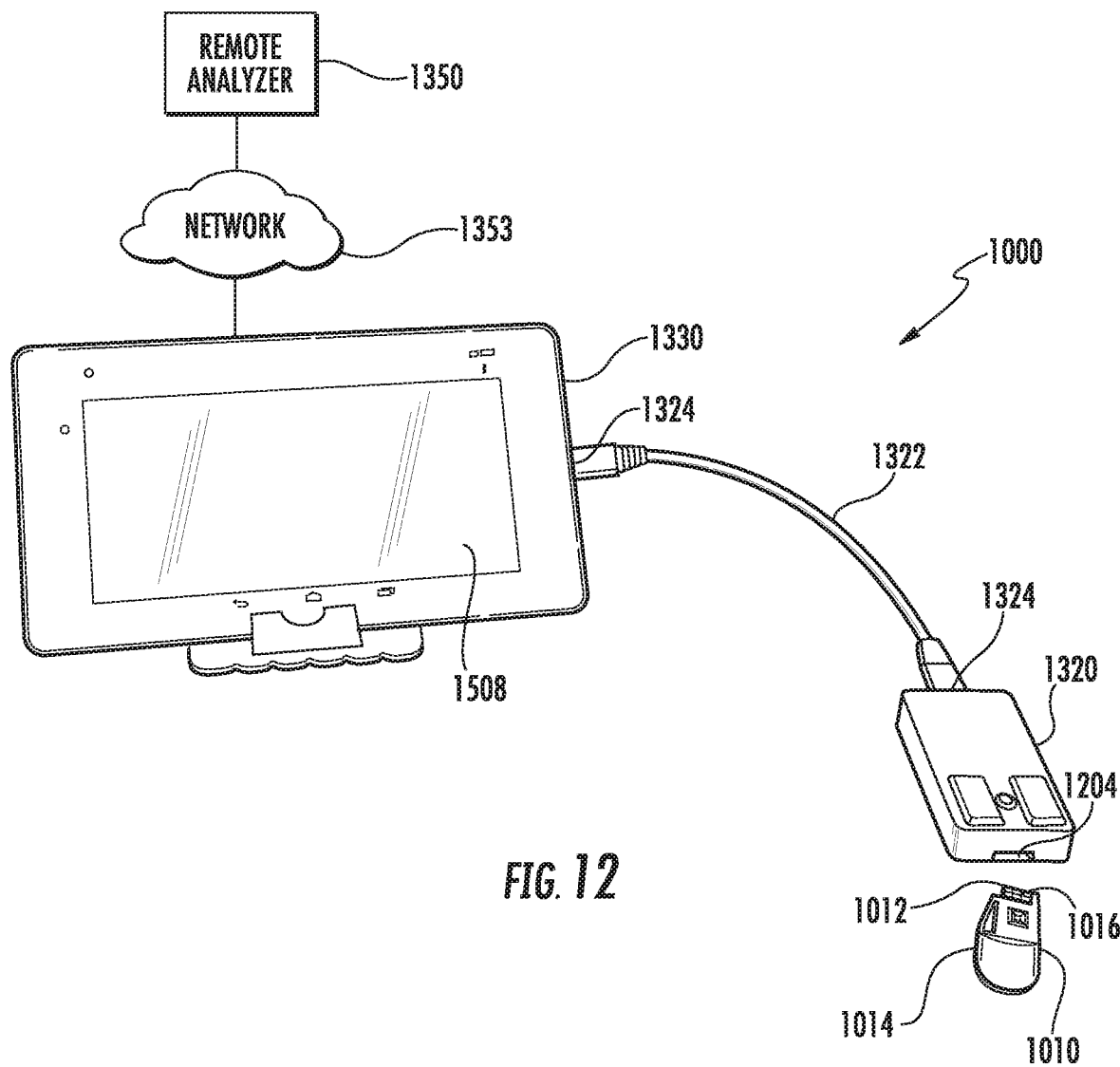
FIG. 12 is a perspective view of an example fluid testing system fluid testing system.

FIG. 12 illustrates an example microfluidic diagnostic or testing system 1000. System 1000 comprises a portable electronic device driven, impedance-based system by which samples of fluid, such as blood samples, are analyzed. For purposes of this disclosure, the term "fluid" comprises the analyte in or carried by the fluid such as a cell, particle or other biological substance. The impedance of the fluid refers to the impedance of the fluid and/or any analyte in the fluid. System 1000, portions of which are schematically illustrated, comprises microfluidic cassette 1010, cassette interface 1320, mobile analyzer 1330 and remote analyzer 1350. Overall, microfluidic cassette 1010 receives a fluid sample and outputs signals based upon sensed characteristics of the fluid sample. Interface 1320 serves as an intermediary between mobile analyzer 1330 and cassette 1010. In the example illustrated, interface 1320 comprises a dongle releasably connected to mobile analyzer 1330 by a cable 1322 releasably or removably connected to interface 1320 at port 1324 and releasably or removably connected to mobile analyzer 1330 at port 1325. Interface 1320 removably connects to cassette 1010 and facilitates transmission of electrical power from mobile analyzer 1330 to cassette 1010 to operate fluid drivers, pumps and sensors on cassette 1010. Interface 1320 further facilitates control of the fluid drivers, pumps, and detectors or sensors on cassette 1010 by mobile analyzer 1330.

Mobile analyzer 1330 controls the operation cassette 1010 through interface 1320 and receives data produced by cassette 1010 pertaining to the fluid sample(s) being tested. Mobile analyzer 1330 analyzes data and produces output. Mobile analyzer 1330 further transmits processed data to remote analyzer 1350 across a wired or wireless network 1353 for further more detailed analysis and processing. In one implementation, mobile analyzer 1330 comprises controller 640 described above. In other implementations, mobile analyzer 1330 comprises any of the other of controllers 140, 240 described above. In the example illustrated, mobile analyzer 1330 comprises a portable electronic device such as a smart phone, laptop computer, notebook computer, tablet computer or the like. As a result, system 1000 provides a portable diagnostic platform for testing fluid samples, such as blood samples.

FIGS. 13-17 illustrate microfluidic cassette 1010 in detail. As shown by FIGS. 13-17, cassette 1010 comprises cassette board 1012, cassette body 1014, membrane 1015 and microfluidic chip 1030. Cassette board 1012, shown in FIGS. 13 and 14, comprises a panel or platform in which or upon which fluid chip 1030 is mounted. Cassette board 1012 comprises electrically conductive lines or traces 1015 which extend from electrical connectors of the microfluidic chip 1030 to electrical connectors 1016 on an end portion of cassette board 1012. As shown in FIG. 12, electrical connectors 1016 are exposed on an exterior cassette body 1014. As shown by FIG. 12, the exposed electrical connectors 1016 are to be inserted into interface 1320 so as to be positioned in electrical contact with corresponding electrical connectors within interface 1320, providing electrical connection between microfluidic chip 1030 and cassette interface 1320.

Cassette body 1014 partially surrounds cassette board 1012 so as to cover and protect cassette board 1012 and microfluidic chip 1030. Cassette body 1014 facilitates manual manipulation of cassette 1010, facilitating manual positioning of cassette 1010 into releasable interconnection with interface 1320. Cassette body 1014 additionally positions and seals against a person's finger during the acquisition of a fluid or blood sample while directing the received fluid sample to microfluidic chip 1030.

FIGS. 13-15 illustrate microfluidic chip 1030. FIG. 13 illustrates a top side of cassette board 1012, chip funnel 1022 and microfluidic chip 1030. FIG. 13 illustrates microfluidic chip 1030 sandwiched between chip funnel 1022 and cassette board 1012. FIG. 14 illustrates a bottom side of cassette board 1012 and microfluidic chip 1030. FIG. 15 is a cross-sectional view of microfluidic chip 1030 below chip funnel 1022. As shown by FIG. 15, microfluidic chip 1030 comprises layers 170, 171, 172 and 174 described above with respect to FIG. 3, wherein filter structures are formed by layers 170 and 172 (as shown in FIG. 3), wherein layer 174 provides a waste or discharge reservoir and wherein resistors, pumps, sensors and circuit traces are formed upon layer 170 adjacent layer 172. Microfluidic chip 1030 comprises a microfluidic reservoir 1034 formed in layer 170 and which extends below chip funnel 1022 to receive the fluid sample (with a reagent in some tests) into chip 1030. In the example illustrated, microfluidic reservoir has a mouth or top opening having a width W of less than 1 mm and nominally 0.5 mm. Reservoir 1034 has a depth D of between 0.5 mm and 1 mm and, in one implantation, a depth of 0.7 mm. As will be described hereafter, microfluidic chip 1030 comprises fluid drivers, pumps and sensors along a bottom portion of chip 1030.

Figure 16:
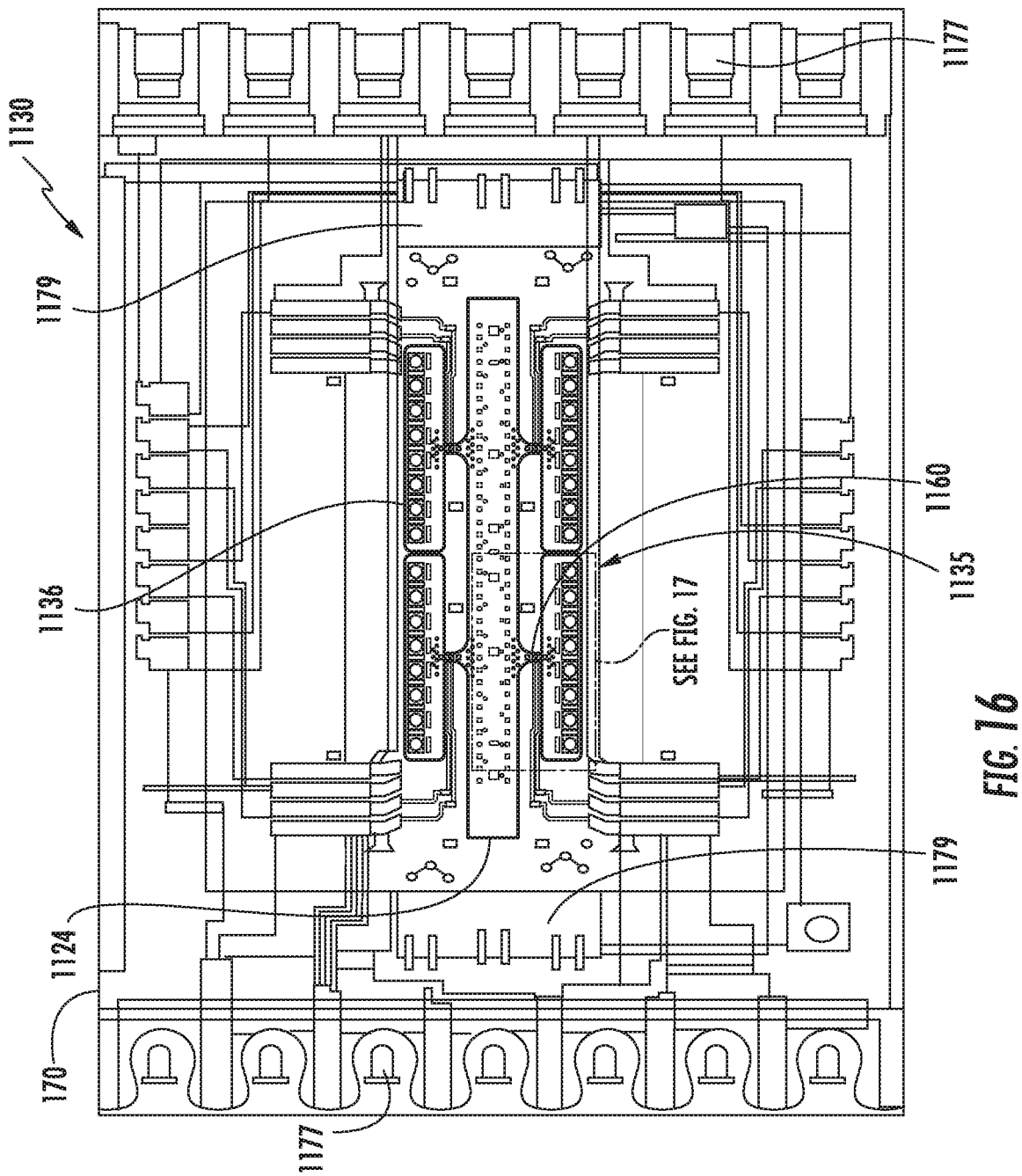
FIG. 16 is a top view of an example microfluidic chip of the microfluidic cassette of FIG. 13.

FIGS. 16 and 17 are enlarged views of microfluidic chip 1130, an example implementation of microfluidic chip 1030. Microfluidic chip 1130 integrates each of the functions of fluid pumping and impedance sensing on a low-power platform. As shown by FIG. 16, microfluidic chip 1030 comprises layer 170 in which is formed microfluidic passage 1124. In addition, microfluidic chip 1130 comprises multiple sensing regions 1135, wherein each sensing region provides a chamber (formed by layer 172) containing multiple nozzles and multiple fluid drivers (formed upon layer 170), an inlet (formed by layer 172) connecting microfluidic passage to the chamber and a sensor (formed upon layer 170) along a surface of the inlet.

As further shown by FIG. 16, microfluidic chip 1130 additionally comprises electrical contact pads 1177 and multiplexor circuitry 1179. Electrical contact pads 1177 are located on end portions of microfluidic chip 1130 which are spaced from one another by less than 3 mm and nominally less than 2 mm, providing microfluidic chip 1130 with a compact length facilitates the compact size of cassette 1010. Electrical contact pads 1177 are electrically connected to the sensors and pumps of chip 1130. Electrical contact pads 1177 are further electrically connected to the electrical connectors 1016 of cassette board 1012 (shown in FIGS. 13-14). When cassette 1010 is plugged into dongle 1320, controller 140, 240, 640 (described above), provided in portable electronic device 1330, is electrically connected to the sensors and pumps of chip 1130 via contact pads 1170.

Multiplexer circuitry 1179 is electrically coupled between electrical contact pads 1177 and the sensors and pumps 1160 of chip 1130. Multiplexer circuitry 1179 facilitates control and/or communication with a number of sensors and pumps that is greater than the number of individual electrical contact pads 1177 on chip 1130. For example, despite chip 1130 having a number n of contact pads, communication is available with a number of different independent components having a number greater than n. As a result, valuable space or real estate is conserved, facilitating a reduction in size of chip 1130 and cassette 1010 in which chip 1130 is utilized. In other implementations, multiplexer circuitry 1179 may be omitted.

FIG. 17 is an enlarged view illustrating one of sensing regions 1135 of chip 1130 shown in FIG. 16. As shown by FIG. 17, sensing region 1135 comprises microfluidic passage 1124, inlet 1226, sensor 1230, chamber 1234, nozzles 1236A, 1236B, 1236C, 1236D, 12636E, 1236F, 1236G and 1236H (collectively referred to as nozzles 1236), fluid drivers 1238A, 1238B, 1238C, 1238D, 12638E, 1238F, 1238G and 1238H (collectively referred to as fluid drivers 1238), stalls 1239, filter structures 1264, filter structures 1266 and inertial pumps 1268, 1270 serving as particles aggregation limiters. Microfluidic passage 1124 and sensor 1130 are similar to microfluidic passage 124 and sensor 130, respectively, described above. Inlet 1226 is similar to inlet 126 described above except that inlet 1226 omits funnel 152, wherein inlet 1226 is the constriction. Inlet 1226 is similar to inlet 26 described above. In one implementation, inlet 1226 has dimensions as described above with respect to inlet 26. Chamber 1234 is similar to chamber 934 described above. In other implementations, chamber 1234 may be similar to chamber 634 described above, wherein chamber 1234 additionally fans out to or towards the two dimensional array of nozzles 1236 and fluid drivers 1238. Fluid drivers 1236 and 1238 are similar to fluid drivers 636 and 638 described above. Stalls 1239 are similar to stalls 741 described above. Filter structures 1264 and 1266 are similar to filter structures 164 and 166 described above. Inertial pumps 1268 and 1270 are similar to inertial pumps 668 and 670, respectively, described above.

During operation of system 1000, controller 140, 240, 640 receives signals from sensor 130 and determines fluid flow, characteristics of the fluid and/or characteristics of the cells or particles within the fluid based upon such signals. Controller 140, 240, 640 additionally controls the actuation of fluid drivers 1238. In one implementation, controller 140, 240, 640 sequentially actuates fluid drivers 1238. In one implementation, controller 140, 240, 640 sequentially actuates first and second fluid drivers or first and second sets of fluid drivers such that an expanding bubble from actuation of the first fluid driver or the bubbles from the actuation of the first set of fluid drivers do not intersect an expanding bubble from actuation of the second fluid driver or the second set of fluid drivers. In one implementation, the actuation of the first fluid driver 1238 creates a positive pressure during a first time in a first region within the chamber proximate to the first nozzle to push fluid through the first nozzle followed by a negative pressure during a second time in the region to draw fluid to the first region, wherein actuation of the second fluid driver 1238 creates a positive pressure during a third time in a second region within the chamber proximate the second nozzle to push fluid through the second nozzle followed by a negative pressure during a fourth time in the second region to draw fluid to the second region and wherein the controller 140, 240, 640 sequentially actuates the second fluid driver following actuation of the first fluid driver following an end of the first time and before expiration of the second time.

Similar to controller 240 in microfluidic sensing system 520, controller 140, 240, 640, connected to chip 1130, actuates inertial pumps 1268, 1270 to facilitate cleaning of particles that may have aggregated within inlet 1226. Actuation of pump 1268 drives fluid from chamber 1234 towards fluid passage 1124 through inlet 1226. Actuation of pump 1270 drives fluid towards chamber 1234 through inlet 1226. In one implementation, pumps 668, 670 are sequentially and alternately actuated to dislodge particles within inlet 1226.

Controller 140, 240, 640 may also actuate pumps 1268, 1270 in an automatic periodic fashion or automatically in response to a detected degree or level of occlusion or blockage of inlet 1226 by particles that have aggregated within inlet 1226. In one implementation, controller 140, 240, 640 controls the timing at which pumps 1268, 1270 are actuated so as to not interfere with the actuation of fluid drivers 638. For example, in one implementation, actuation of fluid drivers 1238 (bubble jet resistors) creates an expanding bubble which subsequently collapses draw fluid into chamber 1234 across inlet 1226. Likewise, actuation of pump 1268, 1270 also creates an expanding bubble which subsequently collapses. In such an implementation, controller 140, 240, 640 does not actuate pump 1268 while fluid is being drawn into chamber 1234 as the bubble created by any of fluid drivers 1238 is collapsing. In one implementation, controller 140, 240, 640 may actuate inertial pump 1270 while the bubble or bubbles created by the actuation of fluid drivers 1238 (bubble jet resistors) are collapsing such that fluid moving through inlet 1226 and across sensing zone 1246 has an accelerated or enhanced velocity as a result of the fluid (A) being drawn by the collapse of the bubbles created by the actuation of fluid drivers 1238 and (B) being pushed by the expansion of the bubble created by the actuation of inertial pump 1270.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An apparatus comprising:
   a chamber;
   a nozzle connected to the chamber;
   a fluid driver proximate the nozzle to expel fluid from the chamber through the nozzle, the fluid driver comprising a fluid ejection device;
   a microfluidic passage;
   an inlet connecting the microfluidic passage and the chamber;
   a sensor proximate the inlet to sense fluid within a sensing zone within the inlet;
   a particle aggregation limiter to control aggregation of particles within the sensing zone, the particle aggregation limiter comprising one or more inertial pumps located on a side of the sensing zone opposite the chamber or a respective side of the sensing zone proximate the chamber; and
   a controller in communication with the fluid driver, the sensor and the one or more inertial pumps, the controller to:
   actuate the fluid driver; and
   actuate the one or more inertial pumps upon detection of the aggregation of the particles within the sensing zone, the detection based upon signals received from the sensor.

2. The apparatus of claim 1, wherein the particle aggregation limiter further comprises particle filtering structures on a side of the inlet opposite the chamber, the particle filtering structures comprising columns or posts.

3. The apparatus of claim 2 comprising:
   a first layer supporting the sensor and the fluid driver;
   a second layer through which the nozzle extends; and
   a third layer sandwiched between the first layer and the second layer, the third layer forming the particle filtering structures, the columns or posts extending between the first layer and the second layer.

4. The apparatus of claim 1, further comprising a second sensor on a side of the sensing zone off to the chamber to sense entrapment of particles, wherein a given inertial pump, of the one or more inertial pumps, is actuated based upon signals from the second sensor, the given inertial pump located on the side of the sensing zone opposite the chamber.

5. The apparatus of claim 1 further comprising, a second nozzle connected to the chamber and a second corresponding fluid driver proximate the second nozzle to expel fluid from the chamber through the second nozzle, wherein the particle aggregation limiter further comprises an array of particle filtering structures on a side of the inlet opposite the chamber, the array of particle filtering structures comprising columns or posts.

6. The apparatus of claim 1, wherein the particle aggregation limiter comprises particle filtering structures on the respective side of the sensing zone adjacent the chamber, the particle filtering structures comprising columns or posts.

7. The apparatus of claim 1 further comprising a reservoir to receive the fluid ejected by the driver through the nozzle.

8. The apparatus of claim 1 further comprising:
a second nozzle connected to the chamber;
a second fluid driver proximate the second nozzle to expel fluid from the chamber through the second nozzle.

9. A method comprising:
ejecting a first fluid from within a chamber through a nozzle to draw a second fluid into the chamber across a sensing zone;
sensing the second fluid within the sensing zone via a sensor located within the sensing zone;
detecting particle aggregation within the sensing zone via the sensor located in the sensing zone; and
in response to detecting particle aggregation within the sensing zone, actuating a plurality of inertial pumps adjacent the sensing zone to eject aggregated particles from the sensing zone to control particle aggregation within the sensing zone, the plurality of inertial pumps actuated sequentially such that different fluid flows produced by actuation of the plurality of inertial pumps do not interfere with one another.

10. A microfluidic chip comprising:
a microfluidic reservoir;
a microfluidic passage connected to the microfluidic reservoir;
a chamber;
a nozzle connected to the chamber;
a fluid driver proximate the nozzle to expel fluid from the chamber through the nozzle, the fluid driver comprising a fluid ejection device;
an inlet connecting the chamber to the microfluidic passage;
a sensor proximate the inlet to sense fluid within a sensing zone within the inlet;
a particle aggregation limiter to control aggregation of particles within the sensing zone, the particle aggregation limiter comprising one or more inertial pumps located on a side of the sensing zone opposite the chamber or a respective side of the sensing zone proximate the chamber; and
a controller in communication with the fluid driver, the sensor and the one or more inertial pumps, the controller to:
actuate the fluid driver; and
actuate the one or more inertial pumps upon detection of the aggregation of the particles within the sensing zone, the detection based upon signals received from the sensor.

* * * * *